United States Patent [19]

Gosteli

[11] 3,917,603

[45] Nov. 4, 1975

[54] METHYL(9-METHYL-ACAIDAN-9-YL)-KETONES

[75] Inventor: Jacques Gosteli, Basel, Switzerland

[73] Assignee: Ciba-Geigy Corporation, Ardsley, N.Y.

[22] Filed: Jan. 5, 1973

[21] Appl. No.: 321,183

Related U.S. Application Data

[62] Division of Ser. No. 140,306, May 4, 1971, abandoned.

[30] Foreign Application Priority Data

May 13, 1970 Switzerland.................. 7068/70

[52] U.S. Cl.......................... 260/279 R; 260/239 D
[51] Int. Cl.$^2$......................................... C07D 219/04
[58] Field of Search ................................. 260/279 R

[56] References Cited

UNITED STATES PATENTS

| 3,016,373 | 1/1962 | Saggiomo et al................. | 260/279 R |
| 3,033,866 | 5/1962 | Saggiomo et al................. | 260/279 R |
| 3,144,440 | 8/1964 | Schendler et al................ | 260/239 D |

FOREIGN PATENTS OR APPLICATIONS

| 1,374,544 | 8/1964 | France........................... | 260/279 R |

OTHER PUBLICATIONS

Bergmann et al., Tetrahedron, Vol. 24, July 14, 1967, pp. 1289–1292.

von Goth et al., Helvetica Chimica Acta, Vol. 48, 1965, pp. 1395–1403.

Primary Examiner—Donald G. Daus
Assistant Examiner—Mary C. Vaughn
Attorney, Agent, or Firm—Joseph G. Kolodny; John H. Maitner; Theodore O. Groeger

[57] ABSTRACT

A new process for the production of 10,11-dimethyl-5H-dibenz[b,f]azepines and 5,10,11-trimethyl-5H-dibenz[b,f]azepines as well as their 2- or 3- substituted derivatives comprises the following reaction steps:

Condensation of a 9-methyl acridine with acetaldehyde, reduction of the obtained ketone to the corresponding secondary alcohol, followed by WAGNER-MEERWEIN rearrangement to the corresponding 10,11-dimethyl-5H-dibenz[b,f]azepine; illustrative embodiments are 10,11-dimethyl-5H-dibenz[b,f]azepine and 3-trifluoromethyl-10,11-dimethyl-5H-dibenz[b,f]azepine.

1 Claim, No Drawings

METHYL(9-METHYL-ACAIDAN-9-YL)-KETONES

This is a division of application Ser. No. 140,306, filed May 4, 1971, now abandoned.

DETAILED DESCRIPTION

The present invention relates to a new process for the production of azepine derivatives.

More particularly, the present invention relates to a new process for the production of compounds of Formula I,

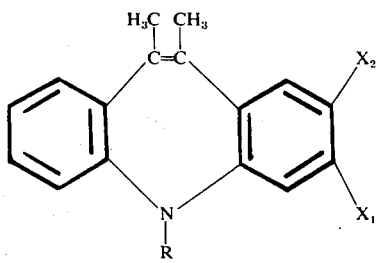

wherein
R is hydrogen or the methyl group,
$X_1$ is hydrogen, chlorine, or the trifluoromethyl group, and
$X_2$ is hydrogen or, if $X_1$ is hydrogen, $X_2$ is hydrogen or chlorine Preferred compounds of formula I which are obtained by means of the new process are:
10,11-dimethyl-5H-dibenz[b,f]azepine;
3-trifluoromethyl-10,11-dimethyl-5H-dibenz[b,f]azepine;
3-chloro-10,11-dimethyl-5H-dibenz[b,f]azepine;
2-chloro-10,11-dimethyl-5H-dibenz[b,f]azepine,
5,10,11-trimethyl-5H-dibenz[b,f]azepine.

The compounds of formula I, which are produced by means of the new process according to the present invention can be used as intermediates for the preparation of pharmacologically highly active compounds. The 10,11-dimethyl-5H-dibenz[b,f]azepine embraced by formula I is known. This azepine derivative is produced according to the British specification No. 961,444 (J. R. Geigy A. G.), starting with 5-acetyl-5H-dibenz[b,f]azepine, in a reaction sequence of eight steps as follows: 5-Acetyl-5H-dibenz[b,f]azepine is brominated with bromine to give 5-acetyl-10,11-dibromo-10,11-dihydro-5H-dibenz[b,f]azepine. The bromination product yields with sodium methylate 10-methoxy-5H-dibenz[b,f]azepine, which is benzylated with benzyl chloride to give 5-benzyl-10-methoxy-5H-dibenz[b,f]azepine. The obtained benzyl compound is converted by means of dilute hydrochloric acid into 5-benzyl-5,11-dihydro-10H-dibenz[b,f]azepin-10-one, which is methylated with sodium amide and methyl iodide to give 5-benzyl-11-methyl-5,11-dihydro-10H-dibenz[b,f]azepin-10-one. From the obtained ketone is obtained according to Grignard, with methyl magnesium iodide, 5-benzyl-10,11-dimethyl-10,11-dihydro-5H-dibenz[b,f]azepin-10-ol, which converts in the presence of dilute hydrochloric acid, by elimination of water, into 5-benzyl-10,11-dimethyl-5H-dibenz[b,f]azepine. By means of debenzylation using hydrogen bromide is finally obtained from the obtained compound: 10,11-dimethyl-5H-dibenz[b,f]azepine. This method would be unsuitable for the preparation of 10,11-dimethyl-5H-dibenz[b,f]azepine derivatives, which are substituted in one benzene nucleus, because there are formed, in the case of the reaction of the corresponding 5-acetyl-10,11-dibromo-10,11-dihydro-5H-dibenz[b,f]azepines with sodium methylate, corresponding isomers: 5-acetyl-10-methoxy- and 5-acetyl-11-methoxy-5H-dibenz[b,f]azepines, which can be separated only with difficulty.

A new process, which is technically superior to known methods, has now been found by means of which, in a reaction sequence of three steps, 10,11-dimethyl- and 5,10,11-trimethyl-5H-dibenz[b,f]azepine as well as derivatives of these compounds, which are substituted in one benzene nucleus, can be produced with good yields.

According to this process, azepine derivatives of the formula I are obtained by a sequence which consists in reacting a compound of formula II:

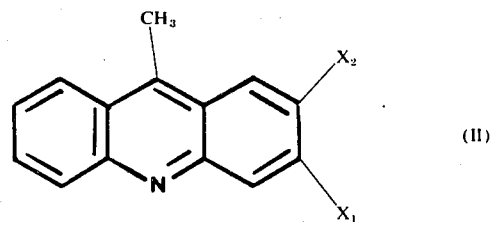

wherein $X_1$ and $X_2$ have the meaning given under formula I, or of corresponding 10-methyl-acridinium compounds, with acetaldehyde, the reduction of the obtained compounds of the general formula III:

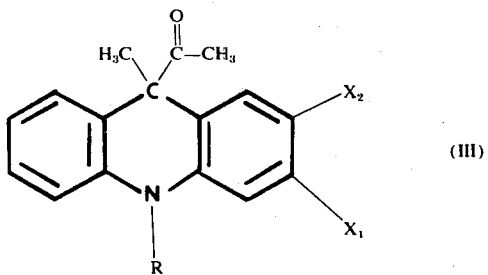

wherein R, $X_1$ and $X_2$ have the meaning given under formula I, to compounds of formula IV

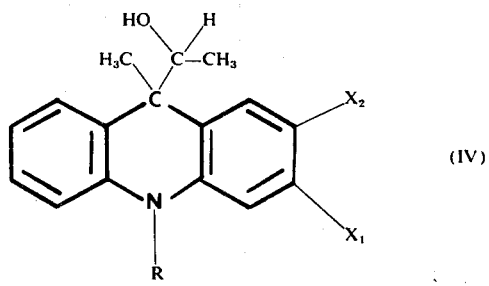

wherein R, $X_1$ and $X_2$ have the meaning given under formula I, and the rearrangement, according to Wagner-Meerwein, of the obtained compounds of formula IV.

On reaction of the compounds of formula II with acetaldehyde are obtained compounds of formula III in good yields. The reaction is performed preferably in acid solution in the presence of peroxides and heavy metal ions. Suitable acids are diluted non-oxidisable mineral acids, e.g., sulphuric acid; suitable peroxides, e.g., hydrogen peroxide or tert.butylhydroperoxide; and suitable heavy metal ions, e.g. iron ions. The reaction temperature is preferably between 0° and 20°C.

It was not possible to anticipate the course of this acylation reaction, in which an acridine derivative is converted by addition of acetaldehyde into an acridan derivative, for, according to T. Caronna et al. (cp. Chemical Communications 1969, 201), who likewise used acetaldehyde as acylation agent, the reaction has a on different mechanism. According to the stated authors are obtained, an acylation of quinoline with acetaldehyde in the presence of hydrogen peroxide or tert.butylhydroperoxide and ferrosulphate-heptahydrate: 2,4-diacetyl-, 2-acetyl-, and 4-acetylquinoline, besides traces of 2- and 4-methylquinoline. In this reaction the acetaldehyde is not added to the quinoline; what does occur is that the quinoline is substituted by the acetyl group and the hydrogen being released simultaneously oxidised.

The reduction of the ketones of the formula III to the corresponding hydroxy compounds can be carried out, e.g., with the aid of complex metal hydrides. Suitable complex metal hydrides, which are used preferably in a solvent, are, e.g., lithium aluminium hydride and, in particular, sodium borohydride. Especially suitable as solvent for lithium aluminium hydride are ethereal liquids such as, e.g., ether or tetrahydrofuran; and for sodium borohydride: lower alkanols such as methanol or ethanol, mixtures of lower alkanols, or mixtures of lower alkanols with water. If lithium aluminium hydride is used as complex metal hydride, the reaction temperature is preferably between 0° and 60°C, and between 0° and 30°C if sodium borohydride is used instead.

According to a second embodiment of the process, the compounds of formula III can be reduced, optionally under nitrogen, with a metal alcoholate in the corresponding alcohol, or also in a hydrocarbon such as, e.g., toluene or xylene. Particularly suitable as a reducing agent is aluminium isopropylate. The reaction is preferably performed at a reaction temperature of about 20° to 85°C.

Furthermore, the compounds of formula III can be reduced with hydrogen in a solvent in the presence of a catalyst. Suitable catalysts are rare metal catalysts such as, e.g., platinum dioxide, or palladium, on a carrier substance, e.g., palladium on charcoal; it is also possible to use metal alloys, such as Raney nickel. Platinum dioxide is preferably used in glacial acetic acid, or in a lower alkanol, e.g., ethanol; and palladium on charcoal, as well as Raney nickel, in a lower alkanol, e.g., methanol or ethanol. The reaction temperature is preferably between 0° and 85°C.

The hydroxy compounds of formula IV can be rearranged according to Wagner-Meerwein to the compounds of formula I, whereby one mol of water is simultaneously split off. The Wagner-Meerwein reaction, starting with hydroxy compounds which are related to the compounds of formula IV, is described in the literature. According to P. N. Craig et al., J.Org.Chem. 26, 135 (1961), 9-acridan methanol is rearranged, whereby one mol of water is split off yielding 5H-dibenz[b,f]azepine. Phosphorous oxychloride, 47% hydrobromic acid, thionyl chloride in pyridine, hydrofluoric acid, zinc chloride, trifluoroacetic acid and its anhydride, polyphosphoric acid, and phosphorus pentoxide in dimethylformamide were less suitable, or not suitable at all, as reagents for this reaction. E. D. Bergmann et al., Tetrahedron 24, 1289 (1968) converted, with the aid of phosphorus pentoxide in xylene, α-propyl-10-methyl-9-acridan-methanol (with 27% yield) into 5-methyl-10-propyl-5H-dibenz[b,f]azepine, α-phenyl-10-methyl-9-acridan-methanol (with 26% yield) into 5-methyl-10-phenyl-5H-dibenz[b,f]azepine, and 2-methoxy-6-chloro-9-acridan-methanol (with 29% yield) into 2-methoxy-7-chloro-5H-dibenz[b,-f]azepine. Moreover, A. J. Saggiomo and J. Weinstock produced according to the USA Patent 3,016,373, using the same process but without giving yield figures, 3-trifluoromethyl-5H-dibenz[b,f]azepine, starting with 3-trifluoromethyl-9-acridan-methanol.

Surprisingly, it has now been found that compounds of formula IV are dehydrated and rearranged, with appreciably better yields (from 61 to 94%), if 70 to 90% sulphuric acid is used instead of the stated reagents. The reaction is preferably performed at a temperature of 0° to 50°C.

The following starting materials, which are embraced by formula II, are described in the literature: 9-methyl-acridine [cp. O. Blum, Chem.Ber. 62, 881 (1929)], 3-trifluoromethyl-9-methyl-acridine (cp. Smith, Kline & French Laboratories, USA Patent 3,016,373), 2-chloro-9-methyl-acridine [cp. A. Campbell et al., J.Chem.Soc. (London) 1958, 1145), and 9,10-dimethyl-acridinium-chloride [cp. A. Kaufmann and A. Albertini, Chem.Ber. 44, 2052 (1911)]. 3-Chloro-9-methyl-acridine can be obtained, e.g. from 3-chloro-5H-dibenz[b,f]azepine (cp. J. R. Geigy A.G., French Patent 1,274,413) by rearrangement in hydrobromic acid. Further starting materials of the general formula II can be produced analogously.

The following examples further illustrate the nature of the present invention but they should not be construed as a limitation of the scope thereof. The temperatures are given in degrees Centigrade.

EXAMPLE 1 a. An amount of 19.3 g (0.100 mol) of 9-methylacridine [cp. O. Blum, Chem.Ber. 62, 881 (1929)] is dissolved, by heating, in 120 ml. of 2-n sulphuric acid. The solution is cooled and diluted with 120 ml of ice water; it is then placed into an ice/sodium chloride bath, and to the solution are added at 9° 29 ml. (0.512 mol) of ice cold acetaldehyde. The temperature of the mixture rises to 15°. The mixture is cooled, with stirring, to 8°, and to it are added dropwise simultaneously a solution (cooled to 4°) of 144 g (0.520 mol) of ferrosulphate-heptahydrate in 480 ml of water, as well as 60 ml (0.450 mol) of 75% tert.butyl hydroperoxide cooled to 2° (Fluka). The reaction solution is thereby vigorously stirred during the addition, and the dropping rate so adjusted that the temperature in the reaction vessel varies between 10° and 13°. After addition of half of the two reagents, a crust is formed on the wall of the vessel, and this crust is removed. After completion of the dropwise addition, stirring is continued for a further 15 minutes, whereby the internal temperature of the reaction vessel falls to 3°. The obtained brown suspension is extracted with methylene chloride; the extract is then washed with water, dried over sodium sulphate, and concentrated in vacuo. The residue is dissolved in 72 ml. of warm abs. benzene, and the solution cooled; it is then filtered through a column of 52 g of silica gel (Merck, grain size 0.05 – 0.2 mm), washed subsequently with 320 ml of abs. benzene, and the benzene eluate concentrated to a small volume. The reaction product is precipitated with petroleum ether from the benzene solution, after which the pure methyl-(9-methyl-acridan-9-yl)-ketone melts at 165° – 168°; yield 16.1 g, 68% of the theoretical value).

b. An amount of 2.0 g (0.010 mol) of 9-methyl-acridine is dissolved, with heating, in 12.5 ml of 2-n sulphuric acid and 20 ml of water. The solution is cooled in an ice bath to 9°; to the solution are then added 3.0 ml (0.053 mol) of acetaldehyde and the whole cooled again to 9°; to the mixture are thereupon added dropwise and simultaneously, within 10 minutes at 7°– 8°, 6.0 ml (0.060 mol) of 30% hydrogen peroxide and a solution of 15.0 g (0.054 mol) of ferrosulphate-heptahydrate in 50 ml of water. Stirring proceeds for a further 5 minutes in the ice bath, and the obtained suspension is extracted with ether. The ether extract is washed with water until the washing water reacts negatively to potassium iodide starch, dried over magnesium sulphate, and concentrated in vacuo. The residue is chromatographed on a column of 30 g of silica gel (Merck, grain size 0.05 – 0.2 mm) with the eluting agent: benzene/hexane (3:1). The eluate is concentrated in vacuo, and the residue recrystallised from hexane, whereupon is obtained the pure methyl -(9-methyl-acridan-9-yl)-ketone, M.P. 157°–161°; yield 1.2 g, 49% of the theoretical value.

c. An amount of 23.7 g (0.100 mol) of the ketone obtained according to a) is dissolved in 300 ml of methanol. The solution is cooled to 10° and to it are then added in portions within 10 minutes, with stirring and in an ice bath, 3.5 g (0.091 mol) of sodium borohydride. Stirring is continued for one hour at 5°, and the reaction solution then concentrated in vacuo to a weight of 70 g. The addition of 6.6 ml of water and some seed crystals produce, after cooling in an ice bath, a commencement of crystallisation. Cooling with ice is continued, 100 ml of water are slowly added, and the whole is allowed to stand for one hour at 0°. The obtained crude product is then filtered off under suction, washed with water until neutral, and dried in vacuo over potassium hydroxide. The dried crystals are recrystallised from methylene chloride/hexane, whereupon the pure $\alpha$,9-dimethyl-9-acridan-methanol melts at 151° – 155°; yield 23 g, 96% of the theoretical value.

d. To a mixture cooled to room temperature of 20 g of ice and 200 ml of conc. sulphuric acid are added within a quarter of an hour, with vigorous stirring, 23.9 g (0.100 mol) of the hydroxy compound obtained according to c). The hydroxy compound goes gradually, with a red colour, into solution, which heats up to 30°. Ninety minutes after commencement of the addition is obtained the clear solution, which is stirred for a further 45 minutes. The solution is then poured on to a mixture of 800 g of ice, 1 litre of water and 500 ml of methylene chloride. The organic phase is separated, and the aqueous phase extracted with methylene chloride. The combined methylene chloride solutions are washed with water, dried over sodium sulphate, and concentrated in vacuo. The residue is dissolved in 200 ml of abs. benzene, and the benzene solution is added to 10 g of silica gel (Merck, grain size 0.05 – 0.2 mm). The adsorbent is filtered off under suction, washed in portions with 100 ml of abs. benzene, and the filtrate concentrated in vacuo. The residue is boiled up with hexane, and the hexane solution cooled to 0°, whereupon the pure 10,11-dimethyl-5H-dibenz[b,f]azepine, M.P. 130°–131°, crystallises out; yield 20.7 g, 94% of the theoretical value.

EXAMPLE 2 a. An amount of 10.0 g (0.038 mol) of 3-trifluoromethyl-9-methyl-acridine (cp. Smith, Kline & French Laboratories, USA Patent 3,016,373) is dissolved in 200 ml of glacial acetic acid and 150 ml of 0.05-n sulphuric acid. The solution is cooled to 10°; to it are then added 11 ml (0.195 mol) of acetaldehyde, and the whole is cooled, in an ice/sodium chloride bath, again to 10°. Simultaneously are then added dropwise within 20 minutes from separate dropping funnels, whilst stirring is maintained, a solution of 55 g (0.198 mol) of ferrosulphate-heptahydrate in 180 ml of water, and 23 ml (0.175 mol) of 75% tert.butylhydroperoxide. The reaction mixture is stirred for a further one hour at room temperature, then diluted with one liter of water, and extracted with ether. The ether extract is washed until neutral with water and with a 10% sodium carbonate solution and water, dried over magnesium sulphate, and concentrated in vacuo. The residue is taken up in abs. benzene, the solution filtered through a column of 140 g of silica gel (Merck, grain size 0.05 – 0.2 mm), and subsequently washed with abs. benzene. The filtrate is concentrated in vacuo, and the residue recrystallised from hexane. Thus obtained is yellowish methyl-(3-trifluoromethyl-9-methyl-acridan-9-yl)-ketone, M.P. 125°–126°; yield 7.0 g, 51% of the theoretical value.

b. An amount of 5.0 g (0.016 mol) of the ketone obtained according to a) is dissolved in 50 ml of methanol; to the solution are then added 0.760 g (0.020 mol) of sodium borohydride, and the whole is stirred for one hour at room temperature. The reaction mixture is carefully concentrated in vacuo, and the residue taken up in 100 ml of methylene chloride. To the methylene chloride solution is added some anhydrous magnesium sulphate; the mixture is afterwards filtered, and the filtrate concentrated in vacuo. Thus obtained are 5.12 g of crude 3-trifluoromethyl-$\alpha$,9-dimethyl-9-acridan-methanol, which is further processed as crude product.

An amount of 5.00 g (0.016 mol) of the obtained hydroxy compound is added to a cooled mixture of 50 ml of conc. sulphuric acid/water (10:1) (vol.ratio). The obtained suspension is stirred for 30 minutes, whereupon it changes into a solution. The red solution is stirred for a further 30 minutes, and then poured on a mixture of 130 ml of 50% potassium hydroxide solution and 800 g of ice. The obtained suspension is diluted in order to dissolve the precipitated potassium sulphate, and the obtained solution extracted with ether. The ether extract is washed with water, dried over magnesium sulphate, and concentrated in vacuo. The residue is dissolved in hot hexane, the hot solution treated, for purification, with active charcoal, and the suspension filtered. The filtrate is concentrated by evaporation, whereby 3-trifluoromethyl-10,11-dimethyl-5H-dibenz[b,f] azepine, M.P. 153°–155°, crystallises out; yield 3.07 g, 65% of the theoretical value.

EXAMPLE 3 a. An amount of 20 g (0.088 mol) of finely ground 3-chloro-5H-dibenz[b,f]azepine (cp. J. R. Geigy A.G., French Pat. No. 1,274,413) is refluxed in 600 ml of 48% hydrobromic acid for 90 minutes. The reaction mixture is then cooled with ice, whereby a portion of the formed 3-chloro-9-methyl-acridine-hydrobromide precipitates. To the obtained suspension are added in portions, with ice cooling, 450 ml of concentrated ammonia solution, and the mixture is extracted with ether. The ethereal solution is washed with water, and extracted with 300 ml of 1-n sulphuric acid. If the crude product precipitates as sulphate, then it is dissolved again by the addition of water. The ether solution is washed three times with water, and the washing water combined with the acid extract. The aqueous acid solution is treated with active charcoal, filtered, and the light-yellow filtrate made alkaline with concentrated ammonia. The precipitated base is taken up in ether; the ether solution is then dried over magnesium sulphate, filtered, and concentrated in vacuo. The residue is taken up in hot hexane, the hexane solution purified with active charcoal, and the solution filtered and concentrated by evaporation. The obtained 3-chloro-9-methyl-acridine, M.P. 117°–118°, crystallises out; yield 17.33 g, 86% of the theoretical value.

b. Analogously to Example 1 a) are obtained, from 22.7 g (0.100 mol) of the acridine derivative prepared according to a), 16.03 g (61% of the theoretical value) of methyl-(3-chloro-9-methyl-acridan-9-yl)-ketone, M.P. 116° – 118° (from ether/hexane).

An amount of 27.4 g (0.100 mol) of this ketone is reduced, analogously to Example 1 c), with 19.1 g (0.500 mol) of sodium borohydride in 550 ml of methanol to give 27.4 g of crude 3-chloro-α,9-dimethyl-9-acridanmethanol.

c. An amount of 27.4 g (0.100 mol) of the hydroxy compound obtained according to b) is reacted, analogously to Example 1 d), with 200 ml of concentrated sulphuric acid/water (10:1) (volume ratio). The obtained crude product (29.0 g) is dissolved in abs. benzene, and the solution added, for purification, to 55 g of silica gel, and then washed out with abs. benzene/ethyl acetate (10:1). The filtrate is concentrated in vacuo, and the residue crysallised from ether/hexane, whereupon 22.8 g of pure 3-chloro-10,11-dimethyl-5H-dibenz[b,f]azepine are obtained, M.P. 137° – 139°; yield 89% of the theoretical value.

EXAMPLE 4 a. An amount of 22.8 g (0.100 mol) of 2-chloro-9-methyl-acridine [cp. A. Campbell et al., J.Chem.Soc. (London) 1958, 1145] is reacted, analogously to Example 1 a), in 35 ml of 2-n sulphuric acid and 65 ml of ice water with 7.2 ml (0.128 mol) of acetaldehyde, 15 ml (0.114 mol) of 75% tert.butylhydroperoxide and 36 g (0.130 mol) of ferrosulphate-heptahydrate dissolved in 120 ml of water to give 13.20 g of methyl-(2-chloro-9-methyl-acridan-9-yl)-ketone, M.P. 134°–135° (from ether/hexane); yield 51% of the theoretical value, relative to 21.8 g of reacted starting product.

b. An amount of 3.11 g (0.114 mol) of the ketone obtained according to a) is reduced, analogously to Example 2 b), with 0.50 g (0.013 mol) of sodium borohydride in 40 ml of methanol, whilst ice cooling is applied. Thus obtained are 3.18 g of crude 2-chloro-α,9-dimethyl-9-acridan-methanol, which, if it is not further processed immediately, must be kept at 0°.

c. An amount of 15.1 g (0.055 mol) of the obtained hydroxy compound is stirred at room temperature in 300 ml of concentrated sulphuric acid/water (10:3) (volume ratio), until a solution is obtained. The reaction mixture is then stirred for a further 30 minutes at the same temperature, and then added, with stirring, to a mixture of 700 ml of 50% potassium hydroxide solution and 2 kg of ice. The obtained suspension is diluted with water, so that the precipitated potassium sulphate dissolves; and the solution extracted with ether. The ether solution is washed with water, dried over magnesium sulphate, and concentrated in vacuo. The residue is recrystallised from ether/hexane, and 11.47 g of 2-chloro-10,11-dimethyl-5H-dibenz[b,f]azepine, M.P. 137°–138°, are obtained; yield 81% of the theoretical value.

EXAMPLE 5 a. An amount of 4.70 g (0.019 mol) of 9,10-dimethyl-acridinium chloride [cp. A. Kaufmann and A. Albertini, Chem.Ber. 44, 2052 (1911)] is dissolved in 110 ml of water. To the solution are added successively, with stirring and ice cooling, 32.0 g (0.115 mol) of ferrosulphate-heptahydrate, 6.0 ml (0.106 mol) of acetaldehyde, and 12.0 ml (0.100 mol) of 75% tert.butylhydroperoxide. The reaction mixture is then stirred for 20 minutes in an ice bath, and afterwards extracted with ether. The ether solution is washed with water, dried over sodium sulphate, and concentrated by evaporation. The residue, dissolved in hexane/benzene (3:1), is applied to a column of 120 g of silica gel (Merck, grain size 0.05 – 0.2 mm), and chromatographed by the elution method. The fractions hexane/benzene (3:1) and hexane/benzene (1:1) yield, after concentration by evaporation and recrystallisation from a little hexane, 2.22 g of methyl-(9,10-dimethyl-acridan-9-yl)-ketone, M.P. 99°; yield 46% of the theoretical value.

b. An amount of 2.01 g (0.008 mol) of the ketone obtained according to a) is reduced, analogously to Example 2 b), in 30 ml of ethanol and 1 ml of methanol with 630 mg (0.016 mol) of sodium borohydride at 15°. The obtained product is crystallised on being washed with hexane, filtered with suction, and recrystallised from hexane. Thus obtained are 1.94 g of α,9,10-trimethyl-9-acridan-methanol, M.P. 108° (from hexane); yield 96% of the theoretical value.

c. An amount of 530 mg (0.002 mol) of ground hydroxy compound, prepared according to b), is added, with stirring, to a mixture (cooled to room temperature) of 0.50 ml of water and 5.0 ml of 96% sulphuric acid, and the obtained suspension stirred for a further hour at room temperature. The suspension changes, after the reaction has ceased, into a clear solution. The solution is poured on to a mixture of 20 g of ice and 50 ml of methylene chloride. The mixture is then diluted with 100 ml of water, the whole shaken, and the organic phase separated. The methylene chloride solution is washed with water, dried over sodium sulphate, and concentrated by evaporation. The residue is taken up in 10 ml of abs. benzene, and to the benzene solution is added 1 g of silica gel. The solution is filtered off from the silica gel, washed then with abs. benzene, and the filtrate concentrated in vacuo. The residue is recrystallised from a little hexane, whereupon is obtained 5,10,11-trimethyl-5H-dibenz[b,f] azepine, M.P. 113°; yield 314 mg, 61% of the theoretical value.

What we claim is:

1. Compounds having the formula

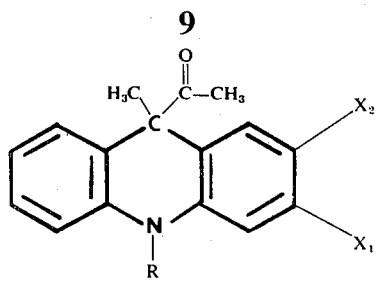
wherein R is hydrogen or methyl,
 $X_1$ is hydrogen, chlorine, or trifluoromethyl, and
 $X_2$ is hydrogen or, if $X_1$ is hydrogen, $X_2$ is hydrogen or chlorine.
* * * * *